United States Patent Office 2,798,027
Patented July 2, 1957

2,798,027

DEWAXING PROCESS

Max Cohen, Gruchet-le-Valasse, France, assignor to Esso Standard Societe Anonyme Francaise, Paris, France, a body corporate No Drawing. Application October 11, 1954, Serial No. 461,666

Claims priority, application France February 22, 1954

9 Claims. (Cl. 196—19)

The present invention relates to an improved process for the de-waxing of mineral oils and particularly relates to the use of an additive composition which improves the rate of filtration of wax from a mineral oil.

De-waxing is one of the more important processes used in the preparation of mineral lubricating oils since removal of the wax results in an oil of markedly lower pour point. The process is usually carried out by chilling the mineral oil in order to precipitate the wax, followed by filtration of the wax from the oil. It is common practice to add solvents to the mineral oil which tend to dissolve the oil and precipitate the wax in order to reduce its viscosity and to facilitate the filtration. Solvents which may be used include liquid paraffins of low boiling point such as propane, butane, pentane, hexane and light petroleum oils, mixtures of ketones and aromatic hydrocarbons such as methyl ethyl ketone and benzene or toluene, and chlorinated hydrocarbons such as dichlorethane and trichlorethylene.

There is a tendency, particularly with thick lubricating oils derived from paraffinic crudes especially Middle East crudes, for the wax crystals to block the filters. This markedly increases the time of filtration and also the amount of mineral oil trapped in the wax cake.

The additive composition of the present invention comprises two components A and B which are defined as follows:

*Component A.*—A Friedel-Crafts condensation product of a halogenated paraffin and aromatic hydrocarbon containing a maximum of three substituent groups and/or condensed rings. The aromatic compound may be a hydroxyl compound such as phenol, cresol or xylenol, or an amine such as aniline, but is preferably naphthalene, phenanthrene or anthracene. The halogen-bearing paraffinic substance may be a chlorinated paraffin wax containing, for example, from 10 to 20% by weight of chlorine. Acid chlorides containing at least 10 carbon atoms per molecule may also be used, as also may chlorinated alcohols, ethers or esters. The preferred chlorine content is from 10 to 20% by weight. Suitable processes for the preparation of the condensation product are given in, for example, the specifications of our British Patents 511,207 and 562,714.

*Component B.*—A polymeric compound formed by polymerising (a) a compound of general formula:

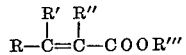

wherein R is hydrogen or an alkyl radical, R' is hydrogen or a halogen atom, R'' is hydrogen, a halogen atom, or an alkyl radical, and R''' is an alkyl, aralkyl, or alicyclic radical having not less than eight carbon atoms. When R and R'' are both alkyl radicals then it is preferred that they each contain not more than 5 carbon atoms. Examples include acrylic, methacrylic, alpha-chloroacrylic, crotonic, alpha-chlorocrotonic acids and mixtures of these; or (b) esters of alpha-beta-unsaturated dicarboxylic acids with either vinyl acetate or styrene. Examples include "Lorol" fumarate copolymerised with either vinyl acetate or styrene; or (c) esters formed from alpha-beta unsaturated carboxylic acids and $C_6$ to $C_{18}$ preferably $C_{10}$ to $C_{15}$ alcohols; or (d) esters of general formula:

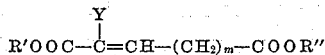

wherein Y is hydrogen or methyl, $m$ is equal to zero or 1, and R' and R'' are alkyl groups preferably having from 6 to 18 preferably 10 to 15 carbon atoms. Examples include esters of maleic, fumaric, glutaconic, alpha-methyl glutaconic, measconic and citraconic acids.

Particularly preferred esters are formed with "Lorol" alcohols being a mixture of hydrogenated alcohols obtained from cocoa-nut oils and having an average chain length of 13.5 carbon atoms. The mean molecular weight of the polymers for the purpose of the present invention is from 5,000 to 70,000 preferably 10,000 to 25,000. Particularly preferred polymers are included in the "Acryloid" series.

The present invention comprises the use of an additive composition which facilitates the filtration of solid wax from mineral oils, which comprises from 5% to 95% by weight of a Friedel-Crafts condensation product of a halogenated paraffin, preferably chlorinated paraffin, with an aromatic hydrocarbon or phenolic compound, and from 95% to 5% by weight of a polymeric compound as hereinbefore defined. Particularly preferred proportions are 25% to 80% preferably 40% to 75% particularly 45% to 55% by weight of the Friedel-Crafts condensation product, and from 75% to 20% preferably 60% to 25% particularly 55% to 45% by weight of the polymeric compound.

It has been discovered that the two components of the additive of the present invention exert a synergistic effect. This is illustrated by the following experiments and examples in which the de-waxing process was carried out on a Bright Stock obtained from a Middle East crude by mixing 500 mols. of the Bright Stock heated to 100° C. with 1250 mols. of a paraffinic petroleum hydrocarbon solvent boiling between 60 and 80° C. and various amounts of additives. The final temperature of the mixture was 55° C. The mixture was cooled from 55° C. to 20° C. at an average cooling rate of 12° C. per minute and was cooled from 20° C. to —40° C. at an average rate of 2° C. per minute.

EXPERIMENT I

The additive used was component A, being the Friedel-Crafts condensation product (as hereinbefore defined) of chlorinated paraffin and naphthalene.

| Additive, percent by weight based on weight of Bright Stock | Filtration Time in minutes | Yield of De-waxed Oil, percent by weight |
|---|---|---|
| 0.20 | 18 | 72 |
| 0.15 | 25 | 72 |
| 0.10 | 45 | 66 |
| 0.05 | 75 | 60 |

EXPERIMENT II

The additive used was a polymer of a pentadecyl methacrylate known as Acryloid 150.

| Additive, percent by weight based on weight of Bright Stock | Filtration Time in minutes | Yield of De-waxed Oil, percent by weight |
|---|---|---|
| 0.10 | >120 Apparently no filtration occurring. | |
| 0.20 | >120 Filtering very slowly indeed. | |

Example I

| Additive | Additive, percent by weight based on Bright Stock | Filtration Time in minutes | Yield of De-waxed Oil, percent by weight |
|---|---|---|---|
| 33.3% wt. Additive of Exp. I | 0.08 | 9 | 73 |
|  | 0.032 | 14 | 72 |
| 66.6% wt. Acryloid 150 | 0.012 | 32 | 72 |
| 55% wt. Additive of Exp. I | 0.12 | 8 | 73 |
|  | 0.06 | 10 | 72 |
| 45% wt. Acryloid 150 | 0.03 | 12 | 72 |
|  | 0.012 | 23 | 72 |
| 75% wt. Additive of Exp. I | 0.073 | 12 | 72 |
|  | 0.037 | 18 | 72 |
| 25% wt. Acryloid 150 | 0.015 | 30 | 72 |
| 90% wt. Additive of Exp. I | 0.088 | 13 | 72 |
|  | 0.044 | 20 | 72 |
| 10% wt. Acryloid 150 | 0.017 | 39 | 69 |

Example II

The additive used was a mixture of 33% by weight of the additive of Experiment I and 67% by weight of a vinyl acetate "Lorol" fumarate copolymer. The copolymer contained 20% by weight of vinyl acetate and 80% by weight of "Lorol" fumarate.

| Additive, percent by weight | Filtration Time in minutes |
|---|---|
| 0.1 | 20 |
| 0.05 | 28 |

The present invention also comprises an improved process for the de-waxing of mineral oils, preferably mineral lubricating oils, of the type wherein solid wax is filtered from the liquid mineral oil usually after cooling the oil, characterised in that a small percentage of the additive composition is dissolved in the mineral oil-wax mixture before filtration.

The amount of the additive used is preferably from 0.001 to 2% especially 0.005 to 1% by weight based on the weight of the mineral oil.

What I claim is:

1. An improved process for dewaxing mineral oils which comprises adding to a wax-containing mineral oil a Friedel-Crafts condensation product of a halogenated paraffin with an aromatic hydrocarbon, and a polymerized unsaturated ester prior to filtering solid wax from the oil.

2. The process of claim 1 wherein the amount of Friedel-Crafts condensation product is in the range of from about 25% to about 80% of total additive.

3. The process of claim 1 wherein said aromatic hydrocarbon is naphthalene.

4. The process of claim 1 wherein said halogenated paraffin is chlorinated wax.

5. The process of claim 1 wherein said polymerized ester has an average molecular weight of from about 5,000 to about 70,000.

6. The process of claim 1 wherein said polymerized ester is a polymer of a $C_6$–$C_{18}$ alcohol ester of an acid selected from the group consisting of acrylic acid and methacrylic acid.

7. The process of claim 1 wherein said polymerized ester is a copolymer of vinyl acetate and the fumaric acid ester of $C_6$–$C_{18}$ alcohols.

8. An improved process for the dewaxing of mineral oils of the type wherein solid wax is filtered from the liquid mineral oil customarily after cooling said oil, characterized in that an additive composition comprising a Friedel-Crafts condensation product of a halogenated paraffin with an aromatic hydrocarbon and also a polymerized unsaturated ester is dissolved in said mineral oil before filtration.

9. The process of claim 8 wherein said additive is present in an amount of from 0.001 to about 2% by weight of mineral oil.

References Cited in the file of this patent

UNITED STATES PATENTS

| | | |
|---|---|---|
| 2,081,519 | Wade | May 25, 1937 |
| 2,150,370 | Frolich et al. | Mar. 4, 1939 |
| 2,184,957 | Gleason et al. | Dec. 26, 1939 |
| 2,196,374 | Wasson et al. | Apr. 9, 1940 |
| 2,254,433 | Lieber | Sept. 2, 1941 |
| 2,491,683 | Munday et al | Dec. 20, 1949 |